Figure 3:
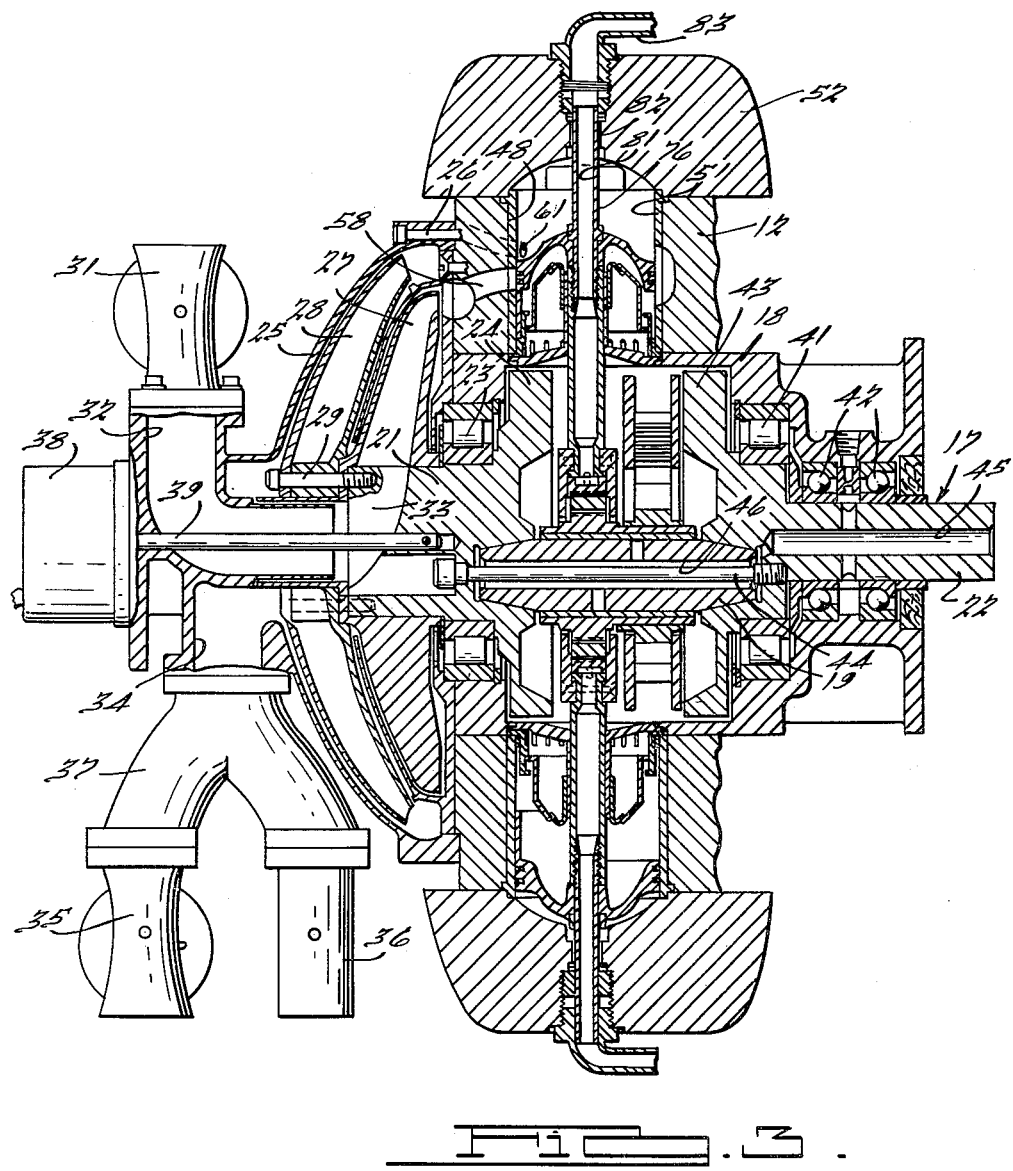

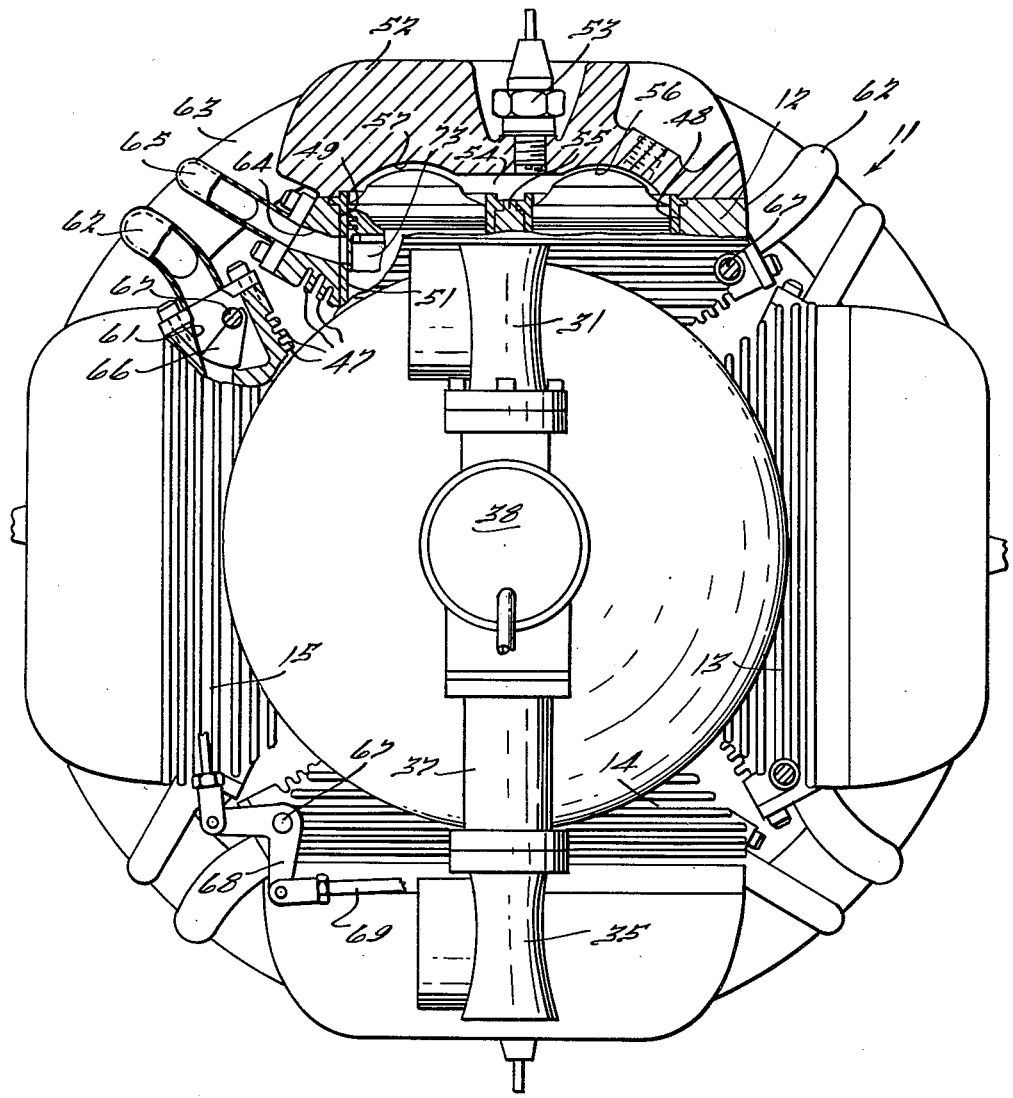

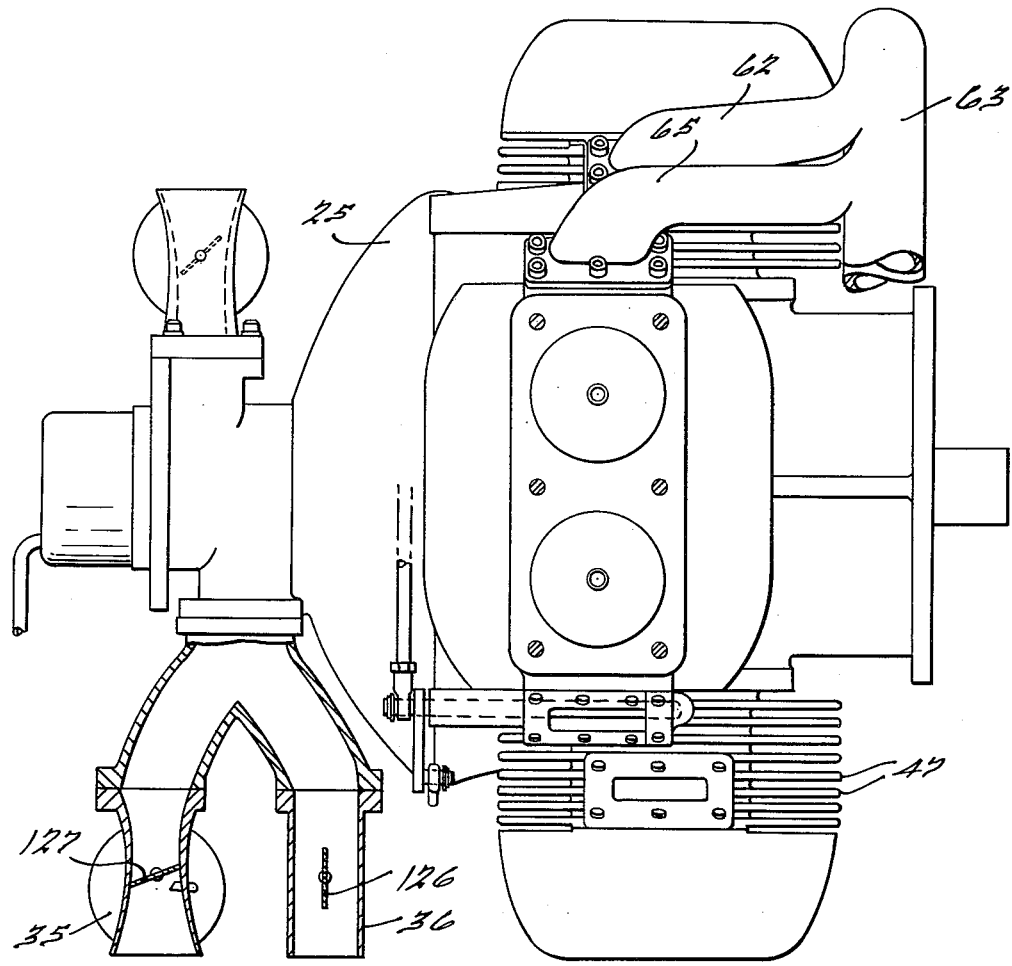
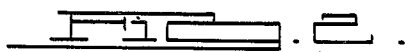

Aug. 29, 1961 W. K. CROWDER 2,997,990
INTERNAL COMBUSTION ENGINE
Filed May 25, 1959 5 Sheets-Sheet 3

INVENTOR.
Wyly K. Crowder.
BY
Harness, Dickey & Pierce
ATTORNEYS.

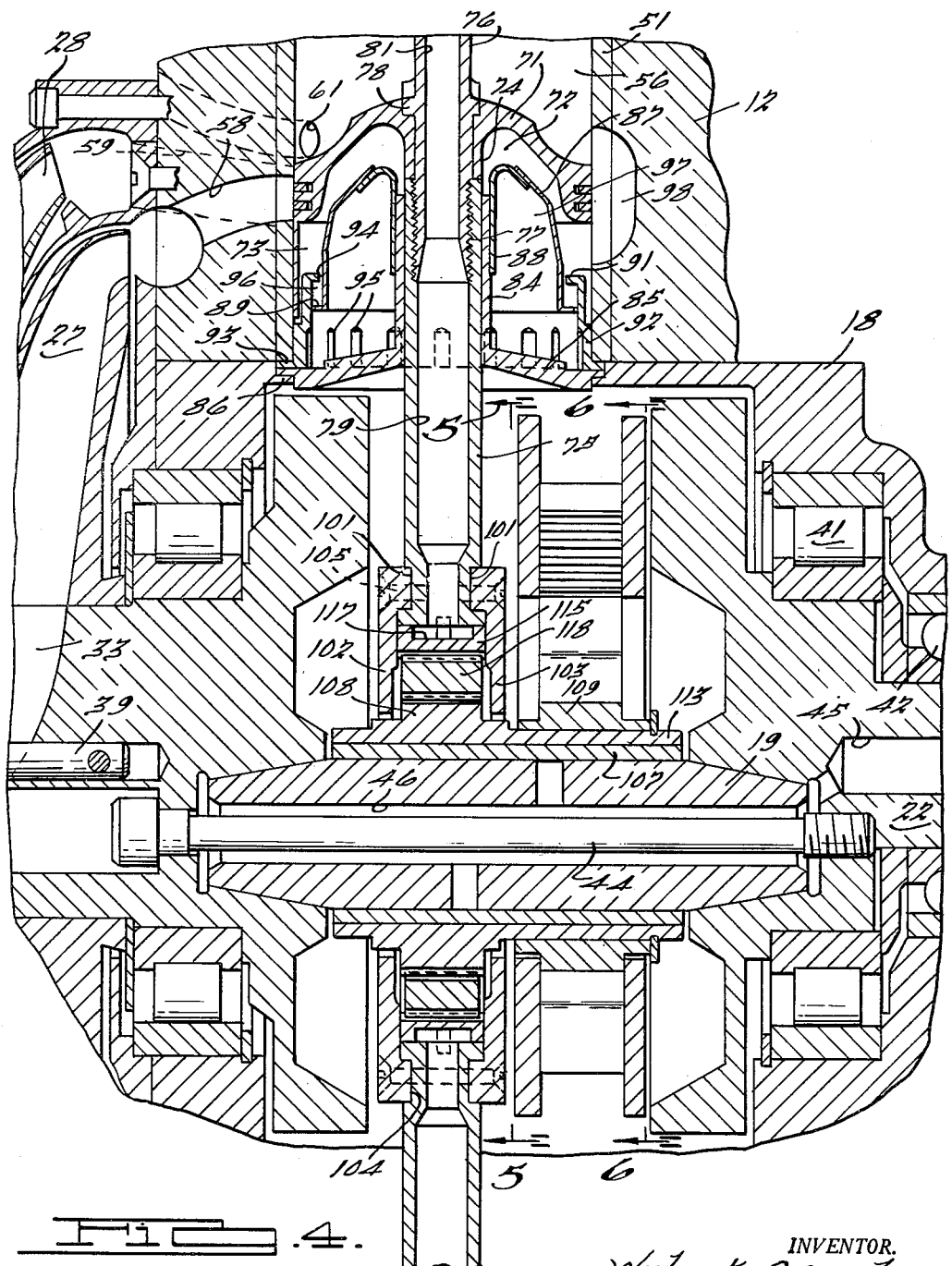

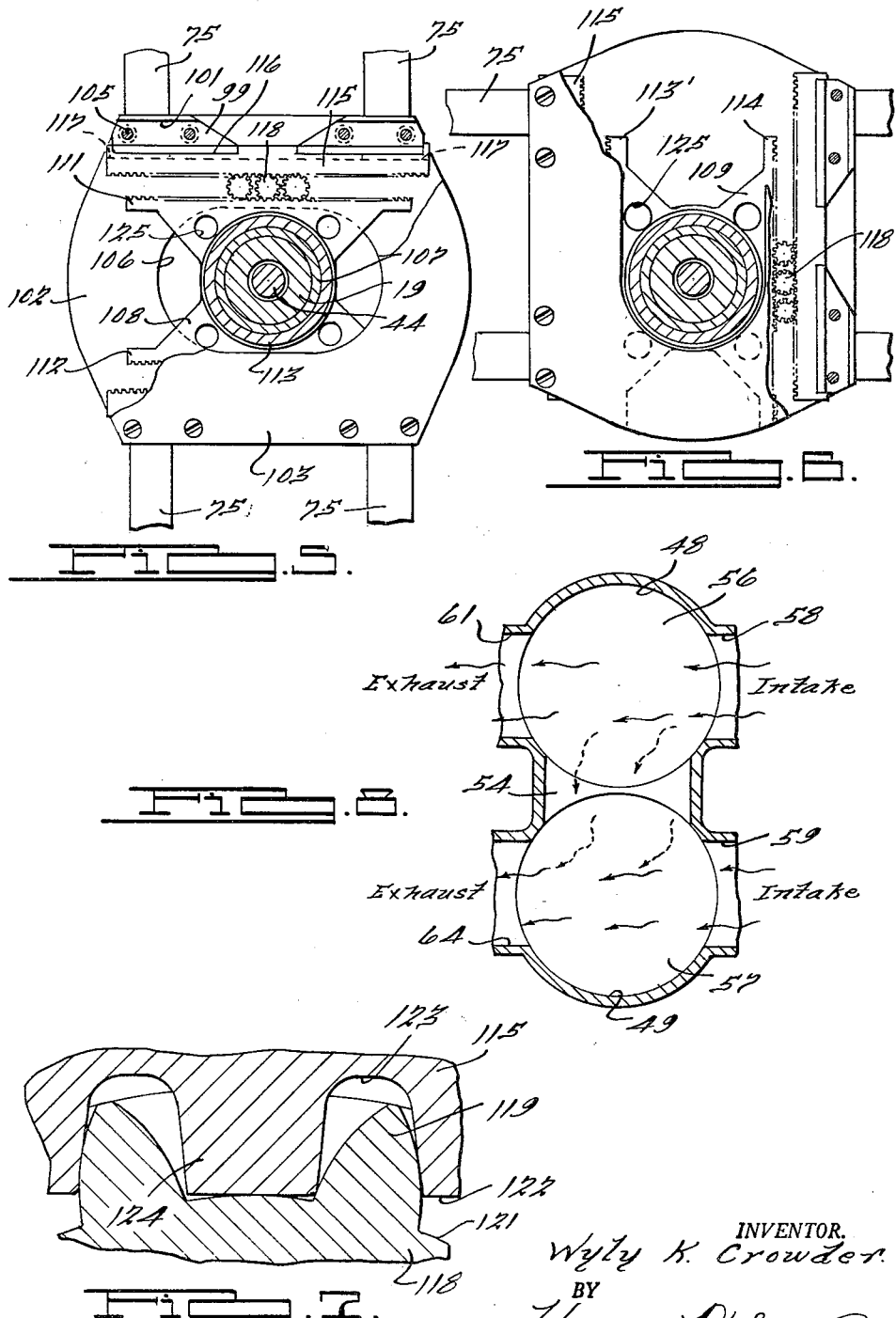

United States Patent Office 2,997,990
Patented Aug. 29, 1961

2,997,990
INTERNAL COMBUSTION ENGINE
Wyly K. Crowder, Troy, Mich., assignor to Harley Earl Associates, Inc., Warren, Mich., a corporation of Michigan
Filed May 25, 1959, Ser. No. 815,527
8 Claims. (Cl. 123—74)

This invention relates to internal combustion engines, and more particularly to engines of the opposed piston type having a two-stroke cycle.

It is an object of the present invention to provide a novel and improved internal combustion engine of this type which is of generally high efficiency, is of economical and compact construction, and gives substantially improved performance over a wide range of operating speeds.

It is another object to provide an improved engine of this nature having novel connecting means between the piston rods and crankshaft which greatly reduces frictional losses as well as inertial loads during operation.

It is a further object to provide an improved two-stroke cycle engine of the above character which includes novel means in the precompression stage for enhancing the efficient flow of fuel-air mixture and permitting the attainment of optimum pressure and flow relationships at low operating speeds.

It is also an object to provide an improved internal combustion engine of this type having pairs of pistons with common combustion chambers, and in which means are provided for altering the intake and exhaust connections to these pistons in such a manner as to insure maximum output at high speeds while preserving fuel economy and burning efficiency at lower speeds.

Other objects and features of novelty of the invention will be specifically pointed out or otherwise become apparent when referring, for a better understanding of the invention, to the following description taken in conjunction with the accompanying drawings wherein:

FIGURE 1 is a front elevational view of the novel internal combustion engine, parts being broken away, and showing the cylinder layout as well as the exhaust ports, valves and valve control means, FIGURE 2 is a side elevational view of the engine, parts being broken away, and showing the exhaust manifold and the parallel air and carburetor inlets for the second-stage pistons, FIGURE 3 is a cross-sectional view looking in the same direction as FIGURE 2 and showing the supercharger arrangement, crankshaft bearing supports and piston construction, FIGURE 4 is an enlarged fragmentary cross-sectional view of a portion of FIGURE 3 showing the precompression diaphragm construction as well as the novel Scotch yoke assembly, FIGURE 5 is a fragmentary cross-sectional view in elevation taken along the line 5—5 of FIGURE 4 and showing the yoke elements, parts being broken away for clarity, FIGURE 6 is a view similar to FIGURE 5 taken along the line 6—6 of FIGURE 4 and showing the yoke construction for the horizontal cylinders, FIGURE 7 is an enlarged fragmentary cross-sectional view showing the interengagement of the rack and roller teeth in the yoke, and FIGURE 8 is a partially schematic view showing the common combustion chamber for a pair of cylinders together with the variably connectable intake and exhaust ports.

In general terms, the invention comprises an internal combustion engine having a plurality of pairs of opposed cylinders, four pairs of cylinders being shown in the illustrated embodiment. Each pair of cylinders is connected to the crankshaft by a novel Scotch yoke construction which includes a pair of racks secured to the pistons and crankshaft respectively, and a plurality of rollers having helical teeth corresponding to the rack teeth and disposed therebetween. The piston forces are thus transmitted to the crankshaft with a minimum of lateral inertial forces or frictional effect. The cylinder porting is arranged for a two-stroke cycle, with a precompression chamber on the inner side of each piston. An annular diaphragm is slidably mounted within each piston to define the precompression chamber. Passages are provided for connecting the precompression chamber with the inner side of the diaphragm when the diaphragm moves to an inner position. A resilient cushion is thus built up behind each diaphragm which permits the diaphragm to retract during each power stroke and urges the diaphragm toward the piston as the latter returns, thus facilitating the flow to the compression chamber throughout the cycle. Each pair of cylinders is arranged with a common combustion chamber, with intake and exhaust ports leading to the vicinity of each cylinder. Means are provided for opening both intake ports and both exhaust ports during relatively high speed operation, and for closing the exhaust port of one cylinder and the intake port of the other cylinder during slow speed operation, so that the combustible product of the first cylinder exhaust will burn in the second cylinder. During such operation, the second cylinder may be supplied with pure air rather than an air-fuel mixture, thus resulting in more complete combustion.

Referring more particularly to the drawings, the novel internal combustion engine is generally indicated at 11 and comprises cylinder blocks having eight cylinder bores arranged in pairs spaced 90° apart with each pair of cylinders being in adjacent parallel relation. As seen best in FIGURE 1, the cylinder blocks are indicated at 12, 13, 14 and 15, with the cylinders in blocks 12 and 14 arranged vertically and those in blocks 13 and 15 horizontally.

As described in detail below, the pistons of cylinder blocks 12 and 14 are connected for movement in unison, as are the pistons of cylinder blocks 13 and 15. A crankshaft generally indicated at 17 is rotatably mounted in a crankcase 18 on which cylinder blocks 12—15 are supported. The pistons within blocks 12 and 14 are connected to an eccentric pin 19 on crankshaft 17 by a novel Scotch yoke mechanism described in detail below, and the pistons within cylinder blocks 13 and 15 are connected to this eccentric pin by a similar yoke mechanism alongside the first mechanism.

The crankshaft construction is best seen in FIGURE 3 and comprises two sections 21 and 22 which are in spaced-apart relation and are connected by eccentric pin 19. Section 21 of the crankshaft extends from the forward end of crankcase 18 and is supported by an antifriction bearing 23 carried by the housing. The inner portion of crankshaft section 21 has a flywheel 24 the weight of which is distributed so as to counteract the inertial effect of the pistons within cylinder blocks 12 and 14. A generally dome-shaped intake housing 25 is secured to the forward portion of crankcase 18 and the cylinder blocks by bolts 26, and two superchargers 27 and 28 are disposed within housing 25 and are drivably connected to crankshaft section 21 by bolts 29. Supercharger 27 is adapted to deliver a fuel-air mixture to a first cylinder of each cylinder pair, whereas supercharger 28 is adapted to deliver air or a fuel-air mixture to the other cylinders of said pairs. A carburetor 31 is mounted on housing 25 and is connected by a passageway 32 to the inlet of supercharger 27, this passageway being generally L-shaped and having an axial portion connecting with supercharger 27 through a passage 33 in the adjacent end of crankshaft section 21. A passage 34 is provided in housing 25 for supplying supercharger 28, this passage being in turn supplied by either a carburetor 35 or an air inlet 36 through a Y-connection 37. A distributor 38 for the ignition system may be mounted at the forward end of housing 25, this distributor being driven by a shaft 39 connected to crankshaft section 21.

Crankshaft section 22 is supported by a radial bearing 41 and thrust bearings 42 carried by housing 18, and extends rearwardly of the housing for connection to a driven element. The inner portion of section 22 carries a flywheel 43 the weight of which is distributed so as to counteract the inertial forces of the pistons within cylinder blocks 13 and 15. The tapered ends of eccentric pin 19 are disposed within corresponding recesses in shaft sections 21 and 22, the parts being held in position by an elongated bolt 44. Appropriate lubricating oil passageways 45 and 46 are provided within shaft section 22 and pin 19 respectively.

The construction of each cylinder block and its associated parts are substantially identical, and may be described best with respect to cylinder block 12 which is shown in section in FIGURES 1, 3, and 4. The exterior of each cylinder block is provided with a plurality of air cooling fins 47, and a pair of cylinder bores 48 and 49 in spaced parallel relation. A cylinder liner 51 is disposed within each cylinder bore, and a cylinder head 52 is secured to each cylinder block and holds liners 51 in position as seen in FIGURE 3. Cylinder head 52 carries a spark plug 53 threadably mounted therein and defines a combustion chamber 54 which is common to both cylinder bores 48 and 49, as seen in FIGURE 1. This combustion chamber has a central area adjacent the partition 55 between the cylinder bores and portions 56 and 57 adjacent cylinder bores 48 and 49 respectively.

The inlet connections from superchargers 27 and 28 to cylinders 48 and 49 respectively are seen best in FIGURES 3 and 4. A plurality of passages 58 connect the discharge end of supercharger 27 with cylinders 48, the locations of the passages being such that supercharger 27 will be connected with a precompression chamber below the corresponding piston when the latter is in its outer position, as later described. Similarly, a plurality of passages shown in dot-dash lines in FIGURE 4 connect the discharge of supercharger 28 with cylinders 49. The exhaust connections from the cylinders are visible in FIGURES 1 and 2. Exhaust ports 61 lead from cylinders 48 and are connected by conduits 62 to an annular exhaust manifold 63 which surrounds housing 18 rearwardly of the cylinder blocks. Similarly, exhaust ports 64 are connected by conduits 65 to manifold 63. The positions of ports 61 and 64 are such that they would be uncovered when the pistons move to their inner positions. Means are provided, for purposes later described, for closing ports 61 so that exhaust gases may not escape directly from chamber portions 56 to the exhaust manifold but must pass through combustion chambers 54 to chamber portions 57. This means comprises a plurality of valves 66 mounted on pivots 67 and simultaneously operable by a linkage comprising bell cranks 68 pivoted at 67 to the cylinder blocks, and links 69.

A piston 71 is slidably mounted in each liner 51. Each piston has a dome-like head convex outwardly to conform generally to combustion chambers 56 and 57, the underside of the piston being concave to define a precompression chamber 72. A skirt 73 extends partially around the underside of piston 71 for co-operation with the corresponding inlet passage 58 or 59, so that the inlet passage will be connected to chamber 72 when the piston is in its outer position but will be closed as the piston moves to its retracted position. Pistons 71 and skirts 73 also control exhaust ports 61 and 64, these ports being closed when the pistons move outwardly but opened to their respective cylinders when the pistons move inwardly. An annular apertured boss 74 extends inwardly from the central portion of each piston 71, and a piston rod 75 is secured to this boss as an extension thereof. The securing means for piston rod 75 comprises a guide rod 76 which extends through apertured boss 74 and is threadably connected at 77 to rod 75, a shoulder 78 being formed at an intermediate portion of rod 76 for co-operation with a counterbored portion on piston 71, as seen in FIGURE 4. Rods 75 and 76 have axial passages 79 and 81 respectively, these passages being contiguous and extending completely through both rods. The purpose of passages 79 and 81 is for the conduction of lubricating oil which will serve to cool the pistons during operation. As seen in FIGURE 3, the upper end of rod 76 is slidably supported at 82 within an apertured portion of cylinder head 52, and a fluid connection 83 leads from the cylinder head and is connected to bore 81. Each piston 71 and its attached piston rod 75 is further slidably supported by a sleeve 84 at the inner end of the cylinder, this sleeve being integrally connected with a disc-shaped closure plate 85 supported by a shoulder 86 in crankcase 18. Plate 85 serves to separate the crankcase compartment from the cylinder and its associated chambers as later described.

A precompression chamber diaphragm 87 is disposed within each piston 71 and is slidably mounted on sleeve 84, as seen in FIGURE 4. Diaphragm 87 is constructed of a plurality of sections of relatively thin metal, it being understood that the particular construction shown could be varied within the principles of the invention. The main portion of diaphragm 87 is of a shape complementary to that of the concave underside of piston 71, with the central portion 88 of the diaphragm being in the form of a sleeve surrounding sleeve 84. An outwardly directed flange 89 is formed on the outer portion of the diaphragm 87, this flange co-operating with an inwardly directed flange 91 formed on a retaining ring 92. This ring is disposed within the inner portion of liner 51 and has a shoulder 93 which is gripped between the inner end of the liner and the outer portion of plate 85. The portion of ring 92 adjacent flange 91 is spaced inwardly from liner 51 to permit clearance for skirt 73 of piston 71. The outer portion of ring 92 has a close sliding fit with flange 81 of diaphragm 87, whereas an annular clearance space 94 exists between flange 91 and diaphragm 87, this clearance space being slight when the diaphragm moves outwardly and increasing as the diaphragm moves inwardly because of the tapered shape of the diaphragm. A plurality of axially extending slots or grooves 95 are formed on the inner surface of ring 92 in circumferentially spaced relation, these slots extending partially but not completely along the inner ring surface. The length of slots 95 is such that when diaphragm 87 has moved inwardly a predetermined distance from the position shown in FIGURE 4, the outer portions of the slots will be connected with annular chamber 96 which is in turn connected to precompression chamber 72 by clearance space 94. It will thus be seen that the annular chamber 97 formed between the underside of diaphragm 87 and plate 85 will be connected to precompression chamber 72 when diaphragm 87 moves inwardly, but will be disconnected from chamber 72 upon outward movement of the diaphragm, and that chamber 96 will serve to cushion this outward movement as the size of space 94 decreases. It may be noted at this point that a conduit 98 is formed in each cylinder block 12 and liner 51 connecting the precompression chamber 72 with combustion chamber 56 or 57 as the piston approaches its inner position.

The novel Scotch yoke construction is seen best in FIGURES 4 to 7. The inner end of each piston rod 75 has a laterally extending shoe 99 formed thereon, this shoe having slots 101 formed on opposite sides thereof. A pair of yokes 102 and 103 of generally plate-like shape are disposed on opposite sides of shoes 99 and have ridges 104 which fit within the grooves and are secured to the shoes by bolts 105, thus securing together each set of four piston rods 75 for movement in unison. Yokes 102 and 103 are provided with elongated central clearance apertures 106 through which retaining pin 19 extends. The retaining pin carries a bearing 107 on which two saddles 108 and 109 are supported. More particularly, saddle 108, which serves to connect the vertically disposed piston rods with eccentric pin 19, has a main portion carrying a pair of outwardly facing racks 111 and 112, and a sleeve portion 113 extending to one side thereof as seen in FIGURE 4. Saddle 109 is rotatably supported by sleeve portion 113 of saddle 108 and similarly has outwardly facing racks 113' and 114 for connection with the horizontally disposed piston rods 75.

A piston rack 115 is secured between the shoes 99 of each pair of piston rods 75 and faces a corresponding rack 111, 112, 113' or 114. The outer surface of each rack 115 is provided with a pair of notches 116 within which a shoe 99 is disposed, so that the rack is held in position relative to its corresponding piston rods 75. The outer ends of each rack 115 are provided with slots or channels 117 extending partially toward the central portion of the rack, the length of recesses 117 being sufficient to connect the interior of the crankcase with the inner ends of bores 79, as seen in FIGURE 4. This will permit unimpeded flow of the lubricating oil from the crankcase through bores 79 and 81 for cooling purposes as described above.

A plurality of toothed rollers 118 is provided between each rack 115 and its opposing rack 111, 112, 113' or 114. Three such rollers are shown in each group in the illustrated embodiment, although a different number could be used if appropriate. The rollers in each group are in spaced-apart relation and are so located as to be in meshing engagement with their corresponding racks throughout the rotary movement of the crankshaft 17.

The construction of the teeth of rollers 118 and their racks is best seen in FIGURE 7, illustrating the meshing of the teeth between a roller 118 and a rack 115. Teeth 119 as well as the rack teeth are preferably helical in order to insure sufficient bearing area and tooth overlap at all times. Teeth 119 of the roller are of involute form, with the root diameter 121 of these teeth being approximately equal to the rolling diameter of the roller without sliding movement. The flat outer surfaces 122 of racks 115 as well as the saddle racks engage surfaces 121 of the rollers, while a clearance exists between the outer ends of teeth 119 and the root surfaces 123 between rack teeth 124 of all the racks. Because of this relationship, the bearing forces between the piston rods and saddles will be transmitted directly through teeth 124 and rollers 118. The meshing of teeth 119 with teeth 124 will, together with the relationship between the rolling diameter and tooth root diameter of rollers 118, insure proper rolling without slipping at all times, even under heavy loads. The involute shape of the teeth will insure conjugate action and will of course contribute to mass production economy of the parts. Because of the relatively small sizes of the rollers which are in effect geared needle bearings, the inertial forces of the parts which could possibly create dynamic unbalance will be relatively slight, even at high speeds. In this connection, lightening holes 125 could be provided in saddles 108 and 109 if desired.

In operation, an air-fuel mixture will be fed from carburetor 31 to supercharger 27 from where it will flow into cylinders 48. Assuming that the engine is being run at normal or high speeds, valve 126 of air inlet 36 will be closed and valve 127 of carburetor 35 will be controlled to permit flow of fuel-air mixture through supercharger 28 to cylinders 49. At this time, valves 66 will be open permitting exhaust flow through ports 61 as well as ports 64 of cylinders 48 and 49 respectively. FIGURE 8 shows in partially schematic fashion the manner of flow of the fuel-air mixture and combustion gases under these conditions. Fuel-air mixture flowing into combustion chamber portions 56 from ports 58 will be ignited, and the combustion gases will exit through ports 61, as shown by the solid arrows in FIGURE 8. Likewise, fuel-air mixture flowing through inlet ports 59 will burn in combustion chamber portions 57 and will exit through exhaust ports 64. There will be little or no cross-flow through the portions of combustion chambers 54 which are disposed between portions 56 and 57. In this manner, maximum breathing and maximum power of all cylinders will be attained at higher speeds.

At lower speeds, exhaust ports 61 may be closed by valves 66. Carburetor 35 leading through supercharger 28 to ports 59 will also be closed, and valve 126 of air inlet 36 may either be closed or opened to permit pure air to flow into combustion chamber portions 57 through ports 59. The relatively rich mixture in cylinder 48 will give good ignition, and the expanding and partially burned combustion gases will then flow across the main portions of combustion chambers 54, as shown by the dotted arrows in FIGURE 8, to cylinders 49. These partially burned gases will burn completely in combustion chamber portions 57, and the additional air flowing through inlet ports 59 will insure high compression and complete oxidizing of the fuel with the least amount of smoke, carbon monoxide or other poisonous gases. The completely burned gases will exit through exhaust ports 64.

During operation of the engine, the pairs of pistons within cylinder blocks 12, 13, 14 and 15 will reciprocate sequentially to rotate the crankshaft 17. As each pair of pistons reaches its outer position, skirts 73 will uncover ports 58 and 59, permitting fuel-air mixture to flow into precompression chambers 72. As each piston 71 is retracted from its outer position during a power stroke, the inlet port will be closed by skirt 73 and the pressure in precompression chamber 72 will increase. Since chamber 97 beneath diaphragm 87 is initially at or near atmospheric pressure, diaphragm 87 will also retract until flange 89 passes slots 95. The pressure in the precompression chamber 72 will then cause gases to flow through slots 95 into chamber 97, building up the pressure therein. Normally, after about ten strokes or so, the pressure in chamber 97 will build up until it is approximately equal to the pressure in chamber 72 when the piston is completely retracted.

After the piston has partially retracted, it will open exhaust port 61 or 64; this may occur after about sixty percent of the power stroke has been completed. The pressure in the combustion chamber will then begin to drop, and after about eighty percent of the power stroke has been completed, port 98 will be uncovered, connecting precompression chamber 72 with the combustion chamber. Assuming that the pressure has been built up in chamber 97, diaphragm 87 will have meanwhile retracted partially to about the position shown in FIGURE 4. As soon as the pressure in the combustion chamber is less than that in the precompression chamber, the fuel-air mixture will flow through port 98 to the combustion chamber.

When the piston begins its upward stroke, the pressure within chamber 97 will cause outward movement of diaphragm 87, thus maintaining the pressure in precompression chamber 72 and the flow through port 98 to the combustion chamber until port 98 is closed. It may be noted that, in the absence of a construction such as movable diaphragm 87, the return movement of the piston to its outer position could well cause a substantial decrease in the pressure of precompression chamber 72 below that in the combustion chamber, which might result in reverse flow through connecting port 98, reducing the effective breathing of the apparatus. By following piston 71 during the initial portion of its outward stroke, diaphragm 87 will also permit an effective vacuum to be produced in precompression chamber 72 immediately after port 98 is closed, since there will be practically no fuel-air mixture left under the piston to expand. Thus, a new charge of fuel-air mixture may be immediately drawn in from the supercharger after the inlet port is again opened. Furthermore, a much higher exhaust back pressure may be obtained in the engine since diaphragm 87 follows the return stroke of the piston, maintaining a high percentage of the maximum pressure created in the precompression chamber. Thus will result in a higher mean effective pressure for the engine.

Another advantage of the novel diaphragm construction is that it eliminates the possibility of excessive exhaust pressure causing exhaust gases to be blown back into the precompression chamber. Assuming that the exhaust pressure were built up to an excessive extent, any resultant rise in the precompression chamber pressure would cause diaphragm 87 to retract sufficiently to connect chamber 72 to chamber 97 through slots 95. The pressure in chamber 97 would thus be built up, and this build-up of pressure would cause a corresponding resistance to the continued flow of exhaust gases from the combustion chamber to the precompression chamber. The presence of the diaphragm will also prevent any deleterious effect which might be created by a precompression chamber of insufficient volume, since the yielding of diaphragm 87 during the retracting stroke of the piston will prevent buildup of excessive back pressure in the precompression chamber. The springing back of the diaphragm after the piston has started its outward stroke will actually aid movement of the piston during the first portion of its return.

It should be noted that as the diaphragm approaches its outer position, the cross-sectional area of the annular connecting space 94 between chamber 72 and annular chamber 76 will be reduced, thus creating a dashpot effect which will cushion and retard the outward diaphragm movement. Naturally, the mass of diaphragm 87 should be as little as possible to reduce inertial effects. Preferably, the outward movement of diaphragm 87 should be somewhat less than the stroke of the piston during the time it is uncovering the inlet ports. This will prevent the maximum velocity of the diaphragm from being excessive and will maintain maximum volume between the diaphragm and the piston when the piston reaches its outer position.

A novel and improved internal combustion engine has thus been provided which is extremely compact in relation to horsepower produced, provides a high degree of fuel efficiency and economy throughout a wide speed range, and incorporates means for greatly reducing frictional inertial losses. The novel Scotch yoke construction in which the loads are transmitted between the rack teeth and the root diameters of the rollers will minimize frictional and inertial losses, the roller teeth 119 maintaining alignment between the rollers and racks. The novel diaphragm construction will greatly reduce the energy required for engine breathing and increase the amount and steadiness of such breathing. The controls for permitting parallel flow of fuel-air mixture through both cylinders of each pair at higher speeds and series flow through the two cylinders at lower or idling speeds will serve to provide maximum power while permitting economical performance when desired. This arrangement enables the engine to operate at its most effective compression ratio at all speeds while still retaining the inherent advantage of a gasoline engine in which the time of ignition may be varied to suit requirements.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a two-stroke cycle internal combustion engine, a cylinder, a piston in said cylinder and forming a combustion chamber outwardly thereof, a diaphragm mounted in said cylinder inwardly of said piston, at least a portion of said diaphragm being movable in the same direction as said piston, said diaphragm and the underside of said piston forming a precompression chamber therebetween, an inlet port connected to said precompression chamber when said piston moves to its outer position, and a transfer port connecting said precompression and combustion chambers when the piston moves to its inner position.

2. In a two-stroke cycle internal combustion engine, a cylinder, a piston in said cylinder and forming a combustion chamber outwardly thereof, a diaphragm mounted in said cylinder inwardly of said piston, at least a portion of said diaphragm being movable in the same direction as said piston, said diaphragm and the underside of said piston forming a precompression chamber therebetween, an inlet port connected to said precompression chamber when said piston moves to its outer position, a transfer port connecting said precompression and combustion chambers when the piston moves to its inner position, and means for imparting a yieldable force to said diaphragm in the direction of said piston during engine operation.

3. In a two-stroke cycle internal combustion engine, a cylinder, a piston in said cylinder and forming a combustion chamber outwardly thereof, a diaphragm mounted in said cylinder inwardly of said piston, at least a portion of said diaphragm being movable in the same direction as said piston, said diaphragm and the underside of said piston forming a precompression chamber therebetween, an inlet port connected to said precompression chamber when said piston moves to its outer position, and a transfer port connecting said precompression and combustion chambers when the piston moves to its inner position, a diaphragm chamber formed between the underside of said diaphragm and the inner end of said cylinder, and means for creating and maintaining a pressurized condition of the gases in said diaphragm chamber during engine operation proportional to the pressure in said precompression chamber.

4. In a two-stroke cycle internal combustion engine, a cylinder, a piston slidably mounted within said cylinder, a piston rod rigidly secured to said piston and extending inwardly therefrom, a diaphragm mounted within said cylinder inwardly of said piston said diaphragm having an annular portion surrounding said piston rod and being guided for movement in the same direction as said piston, said diaphragm and the underside of said piston together forming a precompression chamber, an inlet port, means on said piston for closing said inlet port when piston is retracted and for opening the inlet port to said precompression chamber when the piston is in its extended position, a transfer port connecting said precompression chamber and the combustion chamber above said piston when the piston is in its retracted position, and means for creating a resilient force on said diaphragm urging the diaphragm toward said piston during engine operation.

5. The combination according to claim 4, said last-mentioned means comprising an annular member at the inner end of said cylinder forming a diaphragm chamber with said diaphragm, the diaphragm being movable between inner and outer positions, means separating said diaphragm and precompression chambers when the diaphragm is in its outer position and means for connecting said diaphragm and precompression chambers when the diaphragm is in its inner position.

6. In a two-stroke cycle internal combustion engine, a cylinder, a piston slidably mounted within said cylinder, a piston rod rigidly secured to said piston and extending inwardly therefrom, a diaphragm mounted within said cylinder inwardly of said piston, said diaphragm having an annular portion surrounding said piston rod and being guided for movement in the same direction as said piston, said diaphragm and the underside of said piston together forming a precompression chamber, an inlet port, means on said piston for closing said inlet port when the piston is retracted and for opening the inlet port to said precompression chamber when the piston is in its extended position, a transfer port connecting said precompression chamber and the combustion chamber above said piston when the piston is in its retracted position, an outwardly directed lateral flange on the outer portion of said diaphragm, an inwardly directed lateral flange disposed adjacent the inner end of said cylinder for limiting the outward movement of said diaphragm, the diaphragm being of such shape as to substantially close the connection between said precompression chamber and the annular chamber formed by said flanges when the diaphragm moves to its outer position and to open said connection when the diaphragm moves inwardly, an annular member at the inner end of said cylinder forming a diaphragm chamber with said diaphragm, the diaphragm being movable between inner and outer positions, and slotted means disposed at the inner end of said cylinder and extending partially toward said inwardly directed flange, whereby said slotted means will connect said annular chamber and said diaphragm chamber when the diaphragm moves inwardly.

7. In a two-stroke cycle internal combustion engine, a cylinder, a piston slidably mounted in said cylinder, a piston rod rigidly connected to said piston, a fixed sleeve guiding said piston rod, a diaphragm of thin metal having an annular portion slidably mounted on said sleeve, a main portion of a shape conforming generally to the underside of said piston, and an outwardly directed lateral flange on the outer portion of said diaphragm, said diaphragm and the underside of said piston together forming a precompression chamber, an inlet port, means on said piston for closing said inlet port when the piston is retracted and for opening the inlet port to said precompression chamber when the piston is in its extended position, a transfer port connecting said precompression chamber and the combustion chamber above said piston when the piston is in its retracted position, an annular member fixedly mounted at the inner end of said cylinder and extending toward said piston, an inwardly directed lateral flange at the outer end of said annular member in overlapping relation with said diaphragm flange, a plurality of axially extending slots formed on the inner surface of said annular member, whereby said slots will serve to connect the space beneath said diaphragm with the annular space between said flanges when the diaphragm flange moves inwardly past the outer ends of said slots, and means at the inner end of said cylinder closing off the space beneath said diaphragm to form a closed diaphragm chamber when the diaphragm moves outwardly.

8. The combination according to claim 7, the main portion of said diaphragm being substantially dome-shaped, whereby said annular space between the flanges will be substantially cut off from said precompression chamber when the diaphragm moves outwardly and will be connected to the precompression chamber when the diaphragm moves inwardly.

References Cited in the file of this patent

UNITED STATES PATENTS

| | | |
|---|---|---|
| 952,706 | Lucas | Mar. 22, 1910 |
| 1,611,283 | Scott | Dec. 21, 1926 |
| 1,639,160 | Balcerzak | Aug. 16, 1927 |
| 1,803,795 | Finley | May 5, 1931 |
| 2,014,771 | Mallory | Sept. 17, 1935 |
| 2,137,730 | Smith | Nov. 22, 1938 |
| 2,234,918 | Linthwaite | Mar. 11, 1941 |
| 2,290,202 | Nelson | July 21, 1942 |
| 2,547,163 | Horowitz et al. | Apr. 3, 1951 |

FOREIGN PATENTS

| | | |
|---|---|---|
| 482,634 | France | Jan. 16, 1917 |